United States Patent
Glen (10) Patent No.: US 10,368,108 B2
(45) Date of Patent: Jul. 30, 2019

(54) DOWNSTREAM VIDEO COMPOSITION

(71) Applicant: ATI Technologies ULC, Markham (CA)

(72) Inventor: David I. J. Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 887 days.

(21) Appl. No.: 13/723,486

(22) Filed: Dec. 21, 2012

(65) Prior Publication Data

US 2013/0162911 A1 Jun. 27, 2013

Related U.S. Application Data (60) Provisional application No. 61/578,402, filed on Dec. 21, 2011.

(51) Int. Cl.
| | |
|---|---|
| H04N 5/272 | (2006.01) |
| H04N 21/2343 | (2011.01) |
| H04N 21/43 | (2011.01) |
| H04N 21/434 | (2011.01) |
| H04N 21/47 | (2011.01) |

(52) U.S. Cl.
CPC . *H04N 21/234327* (2013.01); *H04N 21/4307* (2013.01); *H04N 21/4348* (2013.01); *H04N 21/47* (2013.01)

(58) Field of Classification Search
CPC .................................................. H04N 21/4307
USPC .......................................................... 348/586
See application file for complete search history.

(56) References Cited

U.S. PATENT DOCUMENTS

| | | | | |
|---|---|---|---|---|
| 7,336,712 | B1* | 2/2008 | Linnartz | H04N 21/234345 375/240.26 |
| 7,522,219 | B2* | 4/2009 | Carlsgaard | H04N 5/44504 348/465 |
| 2004/0133910 | A1* | 7/2004 | Gordon et al. | 725/37 |
| 2010/0223561 | A1* | 9/2010 | Martin | G06F 3/048 715/752 |
| 2011/0209167 | A1* | 8/2011 | Yamamoto | H04H 60/72 725/9 |
| 2011/0268425 | A1* | 11/2011 | Glen | 386/272 |
| 2011/0293240 | A1* | 12/2011 | Newton et al. | 386/230 |

(Continued)

OTHER PUBLICATIONS

T. Porter and T. Duff, "Compositing Digital Images," Computer Graphics, 1984, Proceedings of SIGGRAPH '84, vol. 18, No. 3, pp. 253-259.

(Continued)

*Primary Examiner* — Jonathan R Messmore
(74) *Attorney, Agent, or Firm* — Faegre Baker Daniels LLP (57) ABSTRACT

A video source, a display and a method of processing multilayered video are disclosed. The video source decodes a multilayered video bit stream to transmit synchronized streams of decompressed video images and corresponding overlay images to an interconnected display. The display receives separate streams of video and overlay images. Transmission and reception of corresponding video and overlay images is synchronized in time. A video image received in the display can be selectively processed separately from its corresponding overlay image. The video image as processed at the display is later composited with its corresponding overlay image to form an output image for display.

11 Claims, 5 Drawing Sheets

(56) References Cited

U.S. PATENT DOCUMENTS

2012/0110356 A1\* 5/2012 Yousefi .................. H04N 7/183
　　　　　　　　　　　　　　　　　　　　　　　　713/320

OTHER PUBLICATIONS

"Blu-ray Disc Format: 2.B Audio Visual Format Specifications for BD-ROM," Mar. 2005, Blu-ray Disc Associate.

\* cited by examiner

DOWNSTREAM VIDEO COMPOSITION

CROSS-REFERENCE TO RELATED APPLICATIONS

This application claims benefits from U.S. Provisional Patent Application No. 61/578,402 filed Dec. 21, 2011, the contents of which are hereby incorporated herein by reference.

FIELD OF THE INVENTION

The present invention relates generally to digital image processing, and more particularly to multilayered video processing.

BACKGROUND OF THE INVENTION

Digital images and video have become increasingly common in entertainment, research, education, business and broadcasting. This is due to the many benefits that result from digital representation of images and video. These benefits include lower overall costs of capturing, storing, processing, and transporting images in digital form. In addition, digital formats allow flexible manipulation of images including the formation of multilayered images with relative ease.

Multilayered digital images are formed by compositing two or more digital images. Compositing typically involves overlaying an overlay image (called the foreground plane), onto a background image (called the background plane). Compositing is detailed, for example in T. Porter and T. Duff, "Compositing Digital Images", Proceedings of SIG-GRAPH '84, 18 (1984).

Pixels in the foreground plane may be opaque or semi-transparent. When compositing, if a pixel in the foreground plane is opaque then the corresponding pixel in the background plane is overwritten. Conversely, if a pixel in a foreground plane is completely transparent, then the corresponding pixel in the background plane becomes the new pixel of the newly formed image.

If a foreground pixel is semitransparent then both the foreground pixel and the corresponding background pixel contribute to the newly formed image pixel in proportion to a transparency value associated with the foreground pixel. Pixels of the foreground and background images that are at the same pixel location are linearly combined in accordance with the transparency value of the foreground image to form pixels of the new composited image.

The transparency value of a semitransparent foreground image pixel is sometimes called the alpha value (denoted by a), and thus digital composition of images is sometimes referred to as alpha-blending.

As will be appreciated, more images/planes may be overlaid onto the newly formed image. The already formed image becomes the new background image, to be combined with a new foreground image in a new composition process.

Examples of multilayered images formed by digital composition include video images with some overlay graphics, picture-in-picture (PiP) video frames, video frames displaying menu options and the like.

The popularity of multilayered digital images has led to the adoption of newer video formats that provide multiple planes of video data. Examples of these newer formats include the Blu-ray format, and the high definition digital versatile disc (HD DVD) format. In Blu-ray, a main video stream is accompanied by a presentation graphics stream and an interactive graphics stream. These graphics streams contain overlay information associated with subtitles, menus, picture-in-picture (PiP) video, command buttons and other types of graphics overlays. Similarly, HD DVD video format includes several streams associated with a main video plane, a background plane, a secondary video plane, a subtitle graphics plane, an application graphics plane, and a cursor plane.

Each of these streams may be compressed. As a result, a video source such as a Blu-ray player or a computing device, typically first decodes each compressed stream to form planes, and then composites corresponding planes to form output images for display.

Composited video images are transmitted to a display. Typical displays include liquid crystal displays (LCD), CRT monitors, digital television (DTV) sets and the like. Some displays may have their own image processing capabilities such as de-interlacing, and color brightness or contrast adjustments.

Unfortunately however, receiving already composited frames restricts the type of image processing that can be applied at a display. In addition, it limits the effective use of existing video processing capabilities of displays that may often be more powerful than the capabilities of typical video sources.

Accordingly, there remains a need for methods and devices that allow flexible and effective processing of multilayered video data received in displays.

SUMMARY OF THE INVENTION

In accordance with an aspect of the present invention, there is provided a method of processing video in a display device. The method comprises: receiving from a video source, a first stream comprising video images decoded at the video source; concurrently receiving a second stream comprising overlay images formed at the video source; selectively processing the received video images at the display device; and compositing the overlay images with the video images, as processed at the device, to form output images for display at the display device.

In accordance with another aspect of the present invention, there is provided a method of providing video from a video source, for processing at a display device. The method comprises: forming video images from a first input bitstream comprising compressed video; forming overlay images from a second input bitstream comprising overlay data; transmitting a first stream comprising the video images to the display device; concurrently transmitting a second stream comprising the overlay images to the display device, for compositing with the video images at the display device.

In accordance with yet another aspect of the present invention, there is provided a video source for providing video to a display. The video source comprises: a stream source providing a first input bitstream comprising compressed video and a second input bitstream comprising overlay data; memory comprising at least a first buffer and a second buffer; a decoder in communication with the stream source and memory, for decoding the first input bitstream to form video images in the first buffer, the decoder also forming overlay images in the second buffer from the second input bitstream; and a display output interface coupled to first and second buffers, for sampling both the first and second buffers, to concurrently transmit a first stream comprising the video images and a second stream comprising the overlay images.

In accordance with still another aspect of the present invention, there is provided a display device comprising: an input interface for receiving a first stream comprising video images and a second a second stream comprising overlay images, from a video source; memory in communication with the input interface; a processing block, a composition engine; and a display screen, all in communication with the memory; the processing block selectively processing the video images, the composition engine compositing the overlay images with the video images as processed by the processing block, to form output images for display on the screen.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
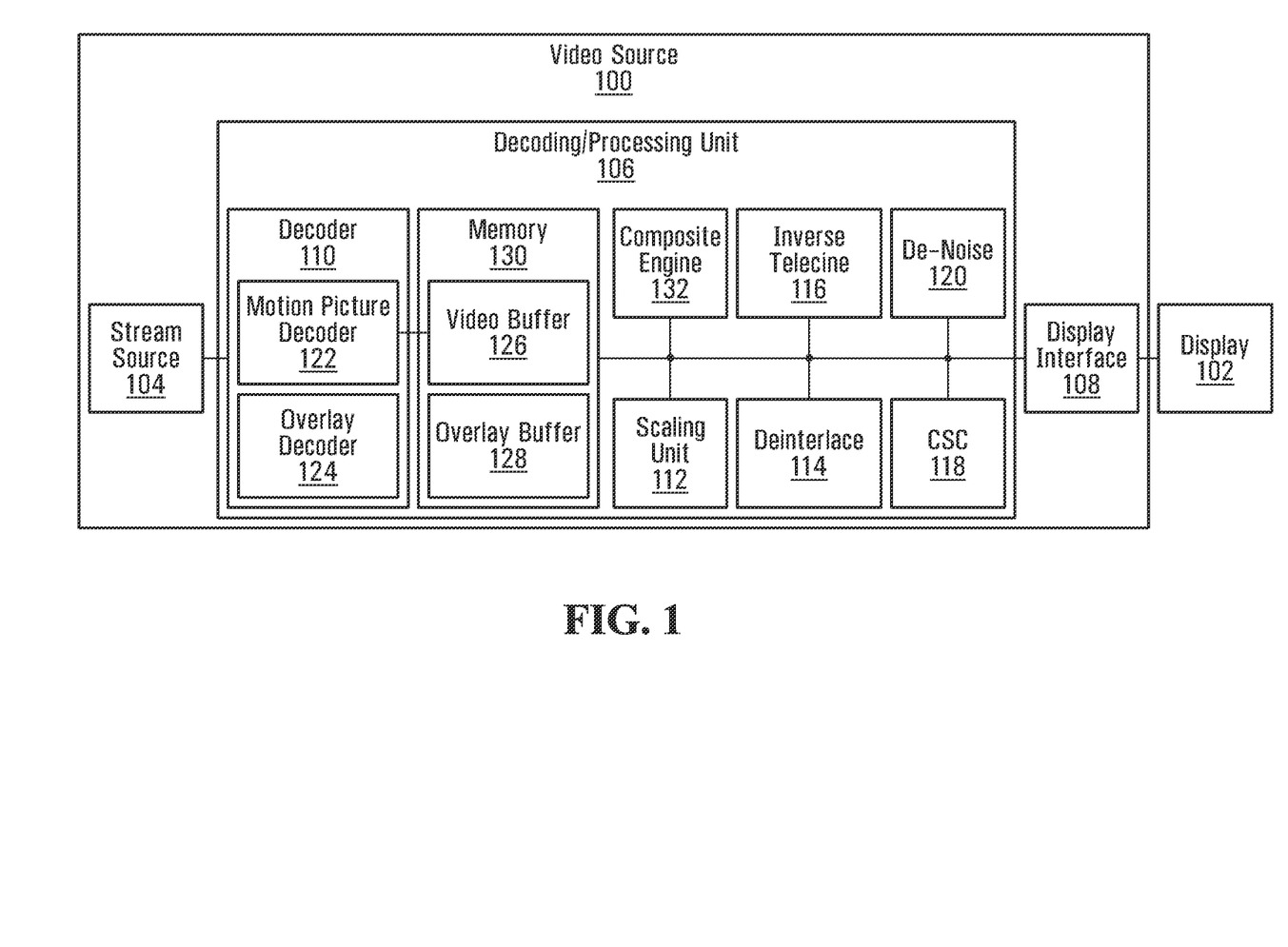
FIG. 1 is a schematic diagram a conventional video source interconnected to a display.

FIG. 1 depicts a schematic diagram a conventional video source 100 interconnected to a display 102. Video source 100 includes a video stream source 104, a video decoding/processing unit 106 and a display interface 108.

Video source 100 may be a personal computer, equipped with an optical drive such as a Blu-ray drive which may function as video stream source 104. In a personal computer, decoding/processing unit 106 may take the form of a graphics processing unit (GPU) formed on a video graphics card that interconnects to display 102.

Display interface 108 is a video output interface circuit such as a RAMDAC, an HDMI interface or a DVI interface. Display interface 108 provides the required physical and electrical interface to a suitable display cable interconnecting display 102.

Various video processing blocks within decoding/processing unit 106 may be used to decode and process incoming video. These blocks include a decoder 110, a scaling block 112, a de-interlace block 114, an inverse telecine block 116, a color space conversion (CSC) block 118, and a de-noising block 120. Decoding/processing unit 106 also includes memory 130 used to form video buffer 126 and overlay buffer 128.

Decoder 110 may itself include a motion picture decoder 122 in the form of an MPEG-2, H.264/MPEG-4 AVC, or similar decoder, and an overlay decoder 124. Decoding/processing unit 106 is typically formed as one or more integrated circuit chips mounted on either a printed circuit board (PCB) such as a peripheral expansion card or a computer motherboard.

In operation, stream source 104 provides an encoded multilayered video data to decoding/processing unit 106. In a personal computer, stream source 104 may be a drive with a suitable medium such as a Blu-ray disc (BD) containing video content. Video stream source 104 which reads and transfers encoded video bitstreams from the disc to decoding/processing unit 106.

A multilayered compressed video input to decoder 110 may include a video bitstream and one or more overlay bitstreams such as the presentation graphics (PG) and interactive graphics (IG) streams typically found in Blu-ray discs. In HD DVD discs, the main video image or plane is obtained from the main video bitstream while the rest (e.g. a background plane, a secondary video plane, a subtitle graphics plane, an application graphics plane, a cursor plane etc.) are obtained from corresponding overlay bitstreams. Decoding compressed bitstreams from Blu-ray discs is discussed for example in a white paper from Blu-ray Disc Association, entitled "Blu-ray Disc Format: 2.B Audio Visual Format Specifications for BD-ROM", March 2005.

Decoder 110 accepts a compressed multilayered video input. Encoded motion video bitstreams such as MPEG encoded bitstreams are decoded by motion picture decoder 122 in decoder 110. Decoded video images are placed in video buffer 126. Similarly, overlay streams may be decoded by overlay decoder 124 and the resulting overlay images may be placed in overlay buffer 128. Corresponding decoded images from each stream are then combined together by compositing engine 132 to form a final image.

Decoding/processing unit 106 may de-interlace fields (using de-interlace block 116) if required. In addition, scaling may be performed using scaling block 112 to fit a smaller resolution image onto a larger resolution display and vice versa. Various methods for scaling images are well known to those of ordinary skill in the art. Removal of visible noise, using de-noising block 120, may also be performed. Optionally, inverse telecine can be performed as needed (using inverse telecine block 116) for video inputs that have 3:2 pull down pattern. Color space conversion may be performed by CSC block 118. After all desired video processing is performed on an output image, the image is provided to display 102 by display interface 108.

As noted above, in conventional processing of multilayered video, decoding is typically followed by compositing (using compositing engine 132). However, the compositing precedes transmission of an output image to display 102. Of course, compositing may be optionally followed by one or more of scaling, de-noising, de-interlacing, inverse telecine, frame rate conversion, de-blocking, and color space conversion.

Transmitting already composited and processed frames or images to display 102 can be disadvantageous. For example, the interconnected display (e.g. display 102) may have superior image processing capabilities including sophisticated de-interlacing, de-noising, scaling, color-space conversion and compositing engines. However, if images received in display 102 are already composited and processed, then many of the video processing blocks present in display 102 would be superfluous. In addition, image processing cannot be applied separately to just the video images (prior to compositing overlay images) in a display that receives already composted images.

To help overcome these disadvantages, in exemplary embodiments of the present invention, an exemplary display having its own composition engine, may receive multiple distinct streams of video and overlay images transmitted from an exemplary video source. The compositing step is not performed upstream at the video source, but rather it takes place downstream—at the display. Individual streams of decompressed video and overlay images may be transmitted to the display concurrently or in a multiplexed fashion. Exemplary displays can thus selectively process video images prior to compositing them with overlay images to form final output images for display.

Figure 2:
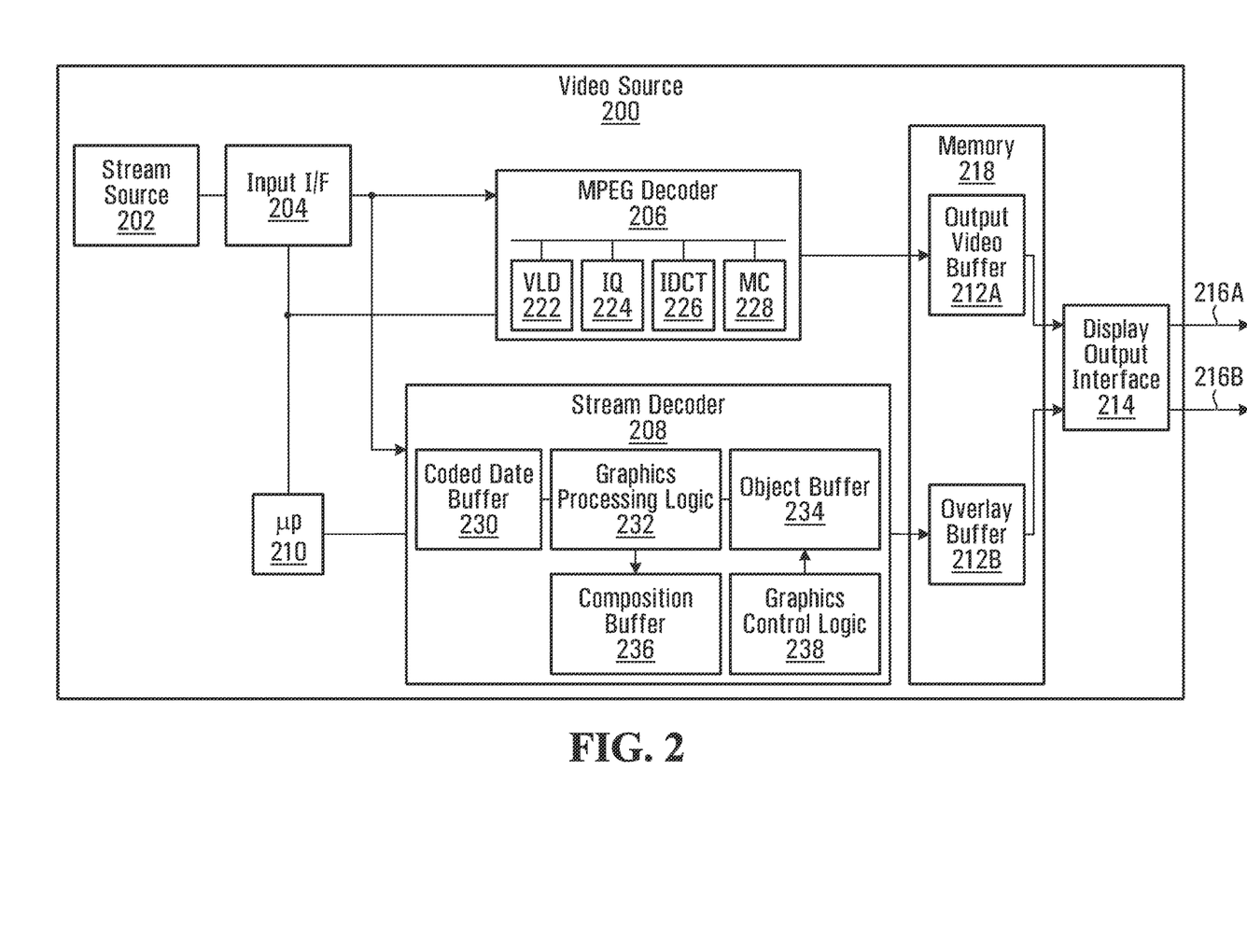
FIG. 2 is a schematic diagram of a video source, exemplary of an embodiment of the present invention.

Accordingly, FIG. 2 depicts an exemplary video source 200 that includes a video stream source 202, a stream input interface 204, decoders 206, 208, a processor 210, a block of memory 218 and a display output interface 214 interconnecting video links 216A, 216B (individually and collectively video links 216). Buffers 212A, 212B (individually and collectively buffers 212) may be formed within memory 218. Video source 200 may for example be a personal computer, a workstation, video player device such as a Blu-ray or HD DVD player, a set-op box, and the like.

Stream source 202, may be an optical drive (e.g., Blu-ray drive) with a suitable medium containing video content (e.g., a Blu-ray disc) loaded therein. Stream source 202 may read and transfer encoded video data from the disc to decoders 206, 208. Alternately, stream source 202 may be a hard disk, a gaming device, a network access point interconnecting a video server or the like. Stream source 202 may also take the form of a tuner/demodulator interconnected to a terrestrial antenna, digital satellite, a coaxial cable, or the like.

Decoder 206 may be a motion video decoder compliant, for example, with one or more of MPEG-2, H.264/MPEG-4 AVC, or SMPTE 421 M (also known as VC-1) or similar video decoding standards. As such, decoder 206 may include several blocks used to decode a standard compressed video bitstream, to output decompressed images or planes of video into buffer 212A. For example, decoder 206 may be substantially similar to decoder 110 of FIG. 1. Decoder 206 may include a variable length decoder (VLD) 222, an inverse quantization (IQ) block 224, an inverse discrete cosine transformer (IDCT) 226, motion compensation (MC) block 228, local internal memory and the like.

Decoder 208 may be an overlay bitstream decoder that receives an overlay bitstream (e.g., the presentation graphics stream or the interactive graphics stream in a Blu-ray disc), to form overlay images or planes into buffer 212B. Decoder 208 may thus include coded data buffer 230, a graphics processing logic 232, an object buffer 234, a composition buffer 236 and a graphics controller logic 238.

Processor 210 may take the form of a microcontroller, a microprocessor, a digital signal processor, a general purpose processor, or the like. Processor 210 may be in communication with one or more of decoders 206, 208, memory 218, input interface 204 and output interface 214 to coordinate the reception of compressed streams, decoding, image construction, processing and data transmission through output interface 214.

Memory 218 may be a block of random access memory (RAM) which may be dynamic or static, and may be shared by processor 210, decoder 206, and decoder 208. Memory 218 may be used to form video buffer 212A and overlay buffer 212B.

Display output interface 214 may be capable of sampling image or plane data (pixel color component and/or transparency data) from multiple buffers (e.g., buffers 212A, 212B in memory 218) and transmitting the data to an interconnected display via video links 216A, 216B. Display output interface 214 may include processing logic to read fixed size units of data (called transfer units, data units, micro-packets, etc.) from buffers 212A, 212B suitable for transmission. As will be detailed later the processing logic may place transparency information about overlay image pixels (from buffer 212B), within unused bits of transfer units for transmission over video link 216B. Optionally output interface 214 may have logic including multiplexer such as a time division multiplexer (TDM) to form packets, and multiplex the packets if video links 216A, 216B share a serial bus.

Video links 216A, 216B interconnect video source 200 to a display. Video link 216A may be used to transmit a stream of video images/planes while video link 216B may be used to simultaneously and synchronously transmit a stream of overlay images/planes corresponding to the video images/planes. The data rate of both video links 216A, 216B may be the same. As will be detailed later, data from corresponding video and overlay images, sent over video links 216A, 216B may be synchronized in time, so that they are received at a display at the same time.

In the exemplary embodiment, video links 216A, 216B are physically separate. Each video link may be similar or compliant to the DisplayPort standard. In other embodiments however, a single serial bus may carry a time division multiplexed traffic of corresponding video and overlay images.

Figure 3:
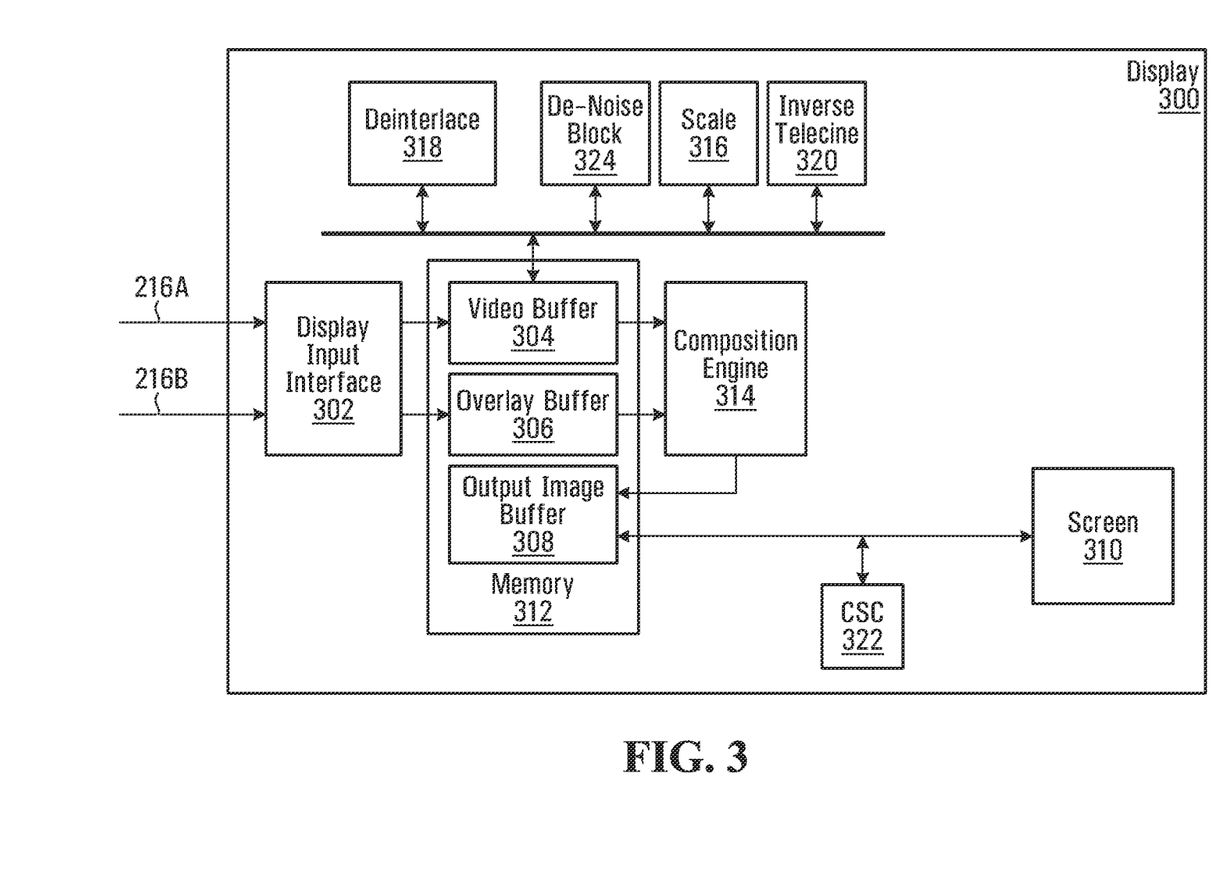
FIG. 3 is a schematic diagram of a display, exemplary of an embodiment of the present invention.

FIG. 3 depicts an exemplary display 300 that may include a display input interface 302, a video image buffer 304, an overlay image buffer 306, an output frame buffer 308 and a display panel or screen 310. Video image buffer 304, overlay image buffer 306 and output frame buffer 308 may be formed inside a block of memory 312. Display 300 may also have multiple video processing blocks including a compositing engine 314, a scaling block 316, a de-interlace block 318, an inverse telecine block 320, a color space conversion (CSC) block 322, and a de-noising block 324.

Compositing engine 314, may be in communication with video image buffer 304, overlay image buffer 306, and output frame buffer 308, and may be used to composite contents of overlay buffer 306 and video buffer 304 to form an output image in buffer 308.

Display input interface 302 may include processing logic, for extracting image/plane data and for manipulating received bits to separate (for overlay images) color components from alpha components. Optionally, display input interface 302 may include a de-multiplexer for de-multiplexing serial data that may be received in a multiplexed format into a video stream and a corresponding overlay stream.

In operation, stream source 202 may provide encoded input bitstream containing compressed video, and an overlay input bitstream to decoders 206, 208 respectively via input interface 204. As noted above, in one embodiment video source 200 may be a personal computer and stream source 202 may be an optical drive having a Blu-ray or HD DVD disc containing compressed multilayered content. Stream source 202 may read and transfer the encoded bitstreams from the disc to decoders 206, 208.

As noted, a Blu-ray disc includes two compressed overlay bitstreams called the presentation graphics (PG) and interactive graphics (IG) streams in addition to the main video bitstream. Similarly, in HD DVD, overlay streams may provide a secondary video plane, a subtitle plane, a cursor plane, etc.

Decoder 206 decodes a compressed input video bitstream received via input interface 204. The encoded video bitstream typically includes various syntax elements to describe the compressed video data. For example, an MPEG-2 encoded stream is organized hierarchically into sequences, group of pictures, pictures, slices, macro-blocks, and blocks respectively. For MPEG compliant stream inputs, decoder 206 may entropy-decode the stream using VLD block 222; perform inverse quantization using IQ block 224; parse the data according to its embedded syntax; extract run-length values; and perform inverse discrete cosine transform using IDCT 224. Motion compensation vectors, if any, are applied by MC block 228 to decoded pixels to compensate for motion of a group of pixels between a reference frame and the current frame. If a compressed stream uses a different syntax, then it may be decoded using the corresponding complementary decoding algorithm. After decoding the main video bitstream, decoder 206 may construct and store video images in buffer 212A inside memory 218.

Decoder 208 may be similarly used to form overlay images from an overlay bitstream input. The overlay input bitstream may be a compressed bitstream such as the presentation graphics stream and interactive graphics streams in a Blu-ray disc. However, the overlay bitstream input need not be a compressed. Decoder 208 may decode a compressed overlay bitstream. Decompressed overlay graphics streams in Blu-ray provide graphics objects such as buttons and text subtitles, to be ultimately overlaid onto video images (provided by decoder 206), during playback. Graphics objects such as buttons are retrieved from a graphics stream and decoded to construct or form graphics overlay images. Transparency information about these objects may be provided as per-pixel alpha or optionally per object alpha values. Specifically, in one mode of Blu-ray called high definition movie mode (HDMV), each pixel in the graphics plane (overlay image) may be represented by an 8-bit value. The 8-bit value is an index a color palette associated with the object. The color palette may contain color entries such as Y,Cb,Cr,A or A,R,G,B values (where A represents the corresponding transparency or alpha value).

Objects are constructed and placed in overlay buffer 212B, for later composition with a corresponding video image (in buffer 212A). Overlay buffer 212B may store both color component and alpha values for each overlay image pixel. That is, each overlay pixel may be stored as a quadruple (red, green, blue, alpha). Of course, any equivalent format conveying both color and transparency information, such as the ARGB, Y,Cb,Cr,A or AYUV format may also be used.

In Blu-ray, a graphics stream may be made up of basic syntactical elements called segments, which are used by decoder 208 to parse the bitstream. There are three types of segments called Graphics Object Segment, Composition Segment and Palette Segment. A Composition Segment describes the appearance of its corresponding graphics object (e.g. button), by way of a number of parameters, including for example, the horizontal and vertical coordinates of the object within the graphics plane, a rectangular region enclosing the object (for text subtitles), cropping information and the like. The Graphics Object Segment may be a run-length encoded bitmap image data. The Palette Segment provides color and transparency data used to translate each 8-bit index value to full color when compositing. Decoder 208 may extract and decode these segments using its graphics processing logic 232 and graphics control logic 238. After Graphics Objects belonging to the same graphics plane are decoded, decoder 208 may construct the graphics plane in overlay buffer 212B. Each decoded graphics object is placed within the graphics overlay buffer 212B in accordance with its associated Composition Segment which contains the necessary placement information.

In embodiments involving multiple overlay images, additional image buffers (like buffer 212B) may be formed in memory 218, to receive and store each of the additional overlay images provided by corresponding additional decoders (like decoder 208). For example, when decoding a Blu-ray disc, the presentation graphics (PG) plane may stored in a first overlay image buffer and the interactive graphics (IG) plane may be stored in a second overlay image buffer. Moreover, additional video links (similar to video link 216B) may be used to transport the additional overlay images from each additional overlay buffer to interconnected display 300.

In another embodiment, all corresponding overlay images (excluding the video image in buffer 212A) may be composited together in buffer 212B to form a single combined overlay image corresponding to the video image in video buffer 212A. That is, when decoding a Blu-ray disc, the PG plane and may be stored in buffer 212B, and the IG plane may be composited onto the PG plane form a single overlay image in buffer 212B. This means that only one overlay image (i.e., from buffer 212B) is transmitted (e.g., over video link 216B) to an interconnected display such as display 300. Advantageously, additional video links would not be required to transport the additional images (i.e., a single combined overlay image is sent video link 216B). However, the video image in buffer 212A is not composited with the single overlay image, in video source 200, but rather separately transmitted to the interconnected display over video link 216A.

Display output interface 214 samples and transmits image data from buffers 212A, 212B to display 300 via video links 216A, 216B respectively. Display output interface 214 may organize the data in buffers 212A, 212B into transfer units prior to transmission. Display output interface 214 may synchronize data traffic over video links 216A, 216B so that, for example, the first pixel or transfer unit of a video image in buffer 212A, and the first pixel or transfer units of its corresponding overlay image in buffer 212B are transmitted and received simultaneously. The data rate over video links 216A, 216B may be the same.

For overlay images, display output interface 214 may pack transparency information (alpha value) along with pixel color components into transmitted units of data (transfer units). In one embodiment, video links 216A, 216B may be variants of the DisplayPort standard. Transparency information for pixels of an image (e.g., for an overlay image) may be easily encoded using the DisplayPort format on a per pixel basis. DisplayPort allows each pixel of a transmitted image to be represented in 18, 24, 30 or 36 bits. For example, after choosing to use 36 bits per pixel (i.e., 12 bits per color component), instead of allocating all 36 bits for color component data, only 24 bits may be used for pixel color data and the remaining (up to 12 bits) may be used to transmit transparency values. Populating unused bits of transmitted data bytes or transfer units, to send side information (e.g., transparency data) from a source device (video source 200) to a sink (display 300), would be well known to those of ordinary skill.

Populating unused bits with transparency data conserves bandwidth on video link 216B. It also makes is easier to maintain synchronization between an overlay image and its corresponding video image, even when only the overlay image may carry transparency information. In the exemplary embodiment, video links 216A, 216B transmit synchronized video and overlay image data at the same rate to display 300. That is, a video image in buffer 212A and its corresponding overlay image in buffer 212B may be the same size, and are transmitted at the same rate over video links 216A, 216B respectively for concurrent reception. Consequently, corresponding pairs of video images and overlay images may be received at display 300 simultaneously. Display 300 may thus composite simultaneously received pairs of video and overlay images.

However, for a given video image in buffer 216A, there may not always be a corresponding overlay image in buffer 216B in video source 200. In that case, as the video image is sent over link 216A, stuffing symbols may be transmitted over link 216B at the same data rate. Display 300 may discard any received stuffing symbols, and simply display the received video image. The use of stuffing symbols to maintain data synchronization between two or more streams is well known in the art. During horizontal and vertical blanking periods for example, or when both buffers 212A, 212B are empty, stuffing symbols may be transmitted over both video links 216A, 216B.

Video image and overlay image data transmitted over video links 216A, 216B may be organized into fixed size transfer units. If the amount of data in buffers 212A, 212B is less than the required fixed size, then stuffing symbols, or equivalent dummy symbols or similarly designated bit patterns, may be used to complete the transfer unit.

In contrast to video source 100 of FIG. 1 (which outputs composited images), the output of video source 200 is image data, from buffers 212A, 212B provided separately to display 300. This allows interconnected display 300 to receive video images separately, and process them selectively, prior to composition with their corresponding overlay images (if any) at display 300.

At display 300, input interface 302 receives video images as a stream via video link 216A, and concurrently receives overlay images or images as another separate stream via video link 216B. After receiving a video image over link 216A, input interface 302 may store it in video image buffer 304. If a corresponding overlay image received over link 216B, the overlay image may be stored in buffer 306.

As noted above, in the exemplary embodiment, data transmission over video links 216A, 216B is synchronized so that corresponding video and overlay images are received simultaneously at display 300. Display input interface 302 may thus receive the first pixel or transfer unit of a video image, and the first pixel transfer unit of its corresponding overlay image simultaneously. Advantageously, no additional processing may be required at display 300 to establish a concordance between a received video image and its corresponding overlay image. However, in other embodiments, other mechanisms may be used to establish concordance between a received video image and its corresponding overlay image. For example, packet headers/identifiers, preambles, synchronization symbols, delineation or flag bit/byte patterns, and the like may be used.

Per-pixel alpha values of overlay images may be extracted by display input interface 302 in accordance with the algorithm used at video source 200 to send the alpha values. Of course, stuffing symbols, dummy symbols, or equivalently designated bit patterns received by input interface 302 may be discarded.

De-noising block 324, and/or scaling block 316 may operate, for example, only on video image buffer 304 to selectively process a video image separately from its corresponding overlay image (stored in buffer 306). De-interlace block 318, may similarly operate on the image in buffer 304. Inverse telecine block 320 may also similarly operate on just the video images in buffer 304.

Compositing engine 314 which forms part of display 300 in the exemplary embodiment of FIG. 3, may then composite the overlay image, and the video image as processed in buffer 304, to form an output image in buffer 308. In other embodiments, a separate output buffer (i.e., buffer 308) may not be needed and buffer 304 may also be used as a composition/output buffer.

Optionally, color space conversion (CSC) block 322, may operate on the image in buffer 308, before it is output to screen 310.

Figure 4:
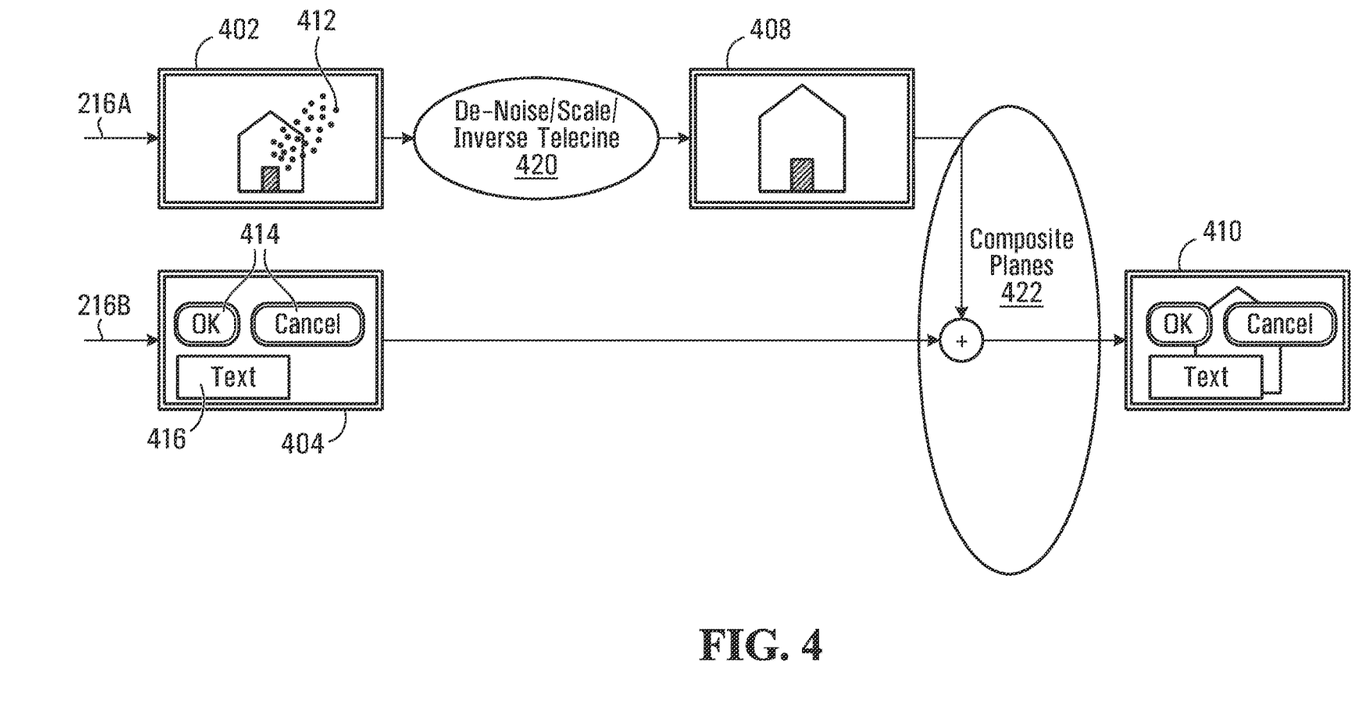
FIG. 4 is a logical diagram illustrating a method of selectively processing a video image prior to compositing it with an overlay image in the display of FIG. 3, exemplary of an embodiment of the present invention.

FIG. 4 depicts a schematic logical diagram of the compositing process involving a video image 402, and an overlay image 404 received in display 300. Image 404 may be an overlay graphics containing buttons 414 and text 416. Video image 402 may contain a visible noise artifact 412.

In the exemplary embodiment, the stream containing image 402 is received over link 216A and while the stream containing overlay image 404 is received via link 216B. Overlay image 404, is then constructed and provided to compositing stage 422 (to be carried out by compositing engine 314). However, video image 402 may be selectively processed, for example, in a de-noising stage 420 (performed by de-noising block 324) first.

De-noising block 324 may operate on image 402 remove noise artifact 412. In other words, de-noising block 324 processes video image 402 to form a processed image 408.

Finally, at compositing stage 422, images 408, 404 are alpha-blended together form output image 410.

As will be discussed below, de-noising only image 402, without having to consider the effects of overlay image 404 may be advantageous. Further processing such as color space conversion (by CSC block 322) may be performed after compositing, as needed.

Compositing engine 314 performs alpha-blending. Alpha-blending involves obtaining transparency information about each of the pixels of an image from each stream and linearly combining pixels occupying the same location in their respective frames, in accordance with their corresponding transparency values to form a final pixel.

As noted above, a simple logic in input interface 302 may be used to extract transparency information (alpha channel) associated with each pixel in an overlay plane. In one exemplary embodiment, DisplayPort may be used to receive 36 bit per pixel data from video source 200, of which 24 bits may be used for pixel component data and 8 bits (or up to 12 bits) may be used to a transmit the pixel's transparency values (denoted $\alpha$).

The transparency value of a given pixel is often called an alpha channel or alpha value for the pixel. Color pixels with transparency values are often stored as quadruples (R, G, B, $\alpha$) in the RGB color space, where R, G, B represent red, green, and blue color components respectively and $\alpha$ represents the opacity or transparency of the pixel. The transparency value $\alpha$ may range from 0 to 1 ($0 \leq \alpha \leq 1$). Typically, $\alpha=0$ denotes complete transparency while $\alpha=1$ denotes total opacity for the associated pixel. Accordingly, $1-\alpha$ represents the fraction of a background pixel that is allowed to pass through to a final image.

Transparency information may be stored in a variety of formats. For example, to avoid multiplication during the compositing, the red, green and blue components may be pre-multiplied and the quadruples may be stored as (R$\alpha$, G$\alpha$, B$\alpha$, $\alpha$). The original color can easily be retrieved by dividing each color component by $\alpha$ for $\alpha \neq 0$.

A pixel $P_0$ at pixel coordinates (x,y) on a background plane (e.g. a video image) and a pixel $P_1$ at the same pixel coordinates (x,y) on a foreground plane (e.g. an overlay image) may be combined as follows. $P_0$ has color and transparency values which may be denoted by the quadruple $(r_0,g_0,b_0,\alpha_0)$ and similarly $P_1$ has color and transparency values $(r_1,g_1,b_1,\alpha_1)$. As noted $P_0$ may be stored in a pre-multiplied format as $(r'_0,g'_0,b'_0,\alpha_0)=(\alpha_0 r_0, \alpha_0 g_0, \alpha_0 b_0, \alpha_0)$. To composite a final image pixel P with color components (R,G,B) at coordinate (x,y) the formula $R=(1-\alpha_1)\alpha_0 r_0+\alpha_1 r_1$ may be used. If pre-multiplied values are used, the equation may be rewritten as $R=(1-\alpha_1)r'_0+r'_1$ where $r'_0=\alpha_0 r_0$ and $r'_1=\alpha_1 r_1$. As will be appreciated, in a computationally simple case the bottom layer may be fully opaque with $\alpha=1$.

All pixels in the foreground overlay image and background video image may thus be alpha-blended as just shown, to construct the composited final image. Similarly the green and blue components of pixel P in the final may be computed as $G=(1-\alpha_1)\alpha_0 g_0+\alpha_1 g_1$ and $B=(1-\alpha_1)\alpha_0 b_0+\alpha_1 b_1$ respectively.

As will be appreciated by persons skilled in the art, very large scale integration (VLSI) techniques may be easily used to integrate one or more of compositing engine 314, scaling block 316, de-interlace block 318, inverse telecine block 320, color space conversion (CSC) block 322, and a de-noising block 324, memory 312 an application specific integrated circuit (ASIC).

In another embodiment, scaling block 316 may be used after alpha blending of corresponding images/planes by compositing engine 314. Alternately, color space conversion and de-interlacing, may be performed prior to compositing by compositing engine 314.

In another alternate embodiment, many more corresponding images may be received, and a subset of the additional images which may benefit from a selected display processing algorithm, may also be processed (e.g., de-noised like video image 402) prior to composition. However, those planes/images likely to confuse the display processing algorithm (e.g., de-noising) would bypass the processing stage (e.g. stage 420) and be supplied directly to composting stage 422.

The ability to selectively apply certain image processing routines in display 300 to individual layers of a multilayered image is advantageous. For example, some image processing algorithms are typically suitable for use only on a subset of layers in a multilayered image.

For example, de-noising algorithms are typically designed for use on video images (as opposed to overlays). A de-noising algorithm commonly attempts to locate the smoothest regions in the image. The de-noising algorithm computes how much de-noise to apply to the image as a whole, based on the smoothest regions. Unfortunately, overlaid images which typically containing very smooth (often computer generated) graphics are likely to lead the de-noising algorithm to an inaccurate estimate of the magnitude and relative distribution of noise in the composited image frame. De-noising is thus best performed on main video images which typically contain natural scenes suitable for the algorithm.

In one embodiment, only main images processed by de-noising block 324 for noise estimation and removal. The de-noising algorithm attempts to decompose an image into a smoother (relatively noise-free) image estimate, and a noise estimate. Typical de-noising methods rely on a filtering parameter h that measures the degree of filtering to be applied to the image. For most methods, the parameter h depends on an estimate of the noise variance. A de-noising algorithm $D_h$ can be defined as a decomposition of an image X into $X=D_h X\; n(D_h+X)$ where $D_h X$ is an image estimate (smoother than image X) and $n(D_h, X)$ is a noise estimate, as determined by the de-noising algorithm $D_h$. Based on the noise estimate, a filtering operation is applied on the original image. De-noising algorithms thus involve a delicate equilibrium between noise reduction and image destruction. Overestimating the noise risks destroying the image, while underestimating the magnitude of the noise risks leaving in much of the noise in after filtering.

Composited images containing smooth overlaid graphics planes misrepresent the image's noise attributes, to the de-noising algorithm. The overlaid graphics may suggest the appearance of a far smoother image that would otherwise be the case if only the main video image had been analyzed (prior to compositing the overlay images). De-noising is thus better applied only to main video images. Accordingly compositing may be performed in display 300, after de-noising the video images only.

It should now be apparent that it is advantageous to selectively perform de-noising (using de-noising block 324) only on the main video image, and only later overlay other images formed from decoded auxiliary or overlay stream (e.g. presentation and interactive graphics steams in Blu-ray). In general, the ability to selectively apply certain display processing tasks to a selected subset of images to be composited, may lead to improved composited image quality. It also provides added flexibility for a performance-quality tradeoff at display 300.

In other embodiments, selective scaling of the received images may be advantageous. In most scaling operations, it may be observed that natural scenery—typically transmitted through the main video image—can scale without many noticeable artifacts. However, overlay images containing computer generated images having sharp, smooth edges may be more visibly distorted when enlarged. Scaling can lead to jagged appearances of some edges (e.g., of subtitle fonts, straight lines and borders of regular polygons, etc.), when the composited video frame is enlarged. Thus, the selective use of scaling block 316, prior to compositing images may be advantageous. For example, slightly different scaling filters may be applied to different video and/or overlay images.

Another advantage of selective application of image processing at a display (e.g., display 300) involves reverse telecine (or inverse telecine) algorithms. Reverse telecine is often required in certain video operations such as frame rate conversion.

Telecine is a process by which fields are inserted into a video stream captured at a slow source rate, to generate a video stream at a higher target frame rate. This typically occurs when it is desired to display cinema, captured at 24 frames per second (fps), on a television set operating at the NTSC (National Television System Committee) standard frame rate of 29.97 fps. Telecine is a process by which the original cinema film, recorded at 24 fps, is first slowed down by 0.1% to 23.976 fps and then for every 4 frames, one extra frame is created from fields of adjacent frames to yield: (24 fps) (99.9%) (5/4)=29.97 fps.

The odd and even numbered lines of each frame are called the top field (also called odd field) and a bottom field (also called even field) respectively. The original film's field sequence is {1T, 1B, 2T, 2B, 3T, 3B, 4T, 4B . . . }. The telecine sequence however, is {1T, 1B, 1T, 2B, 2T, 3B, 3T, 3B, 4T, 4B . . . }. This is commonly called 3:2 pull down sequence because of the alternating pattern of 3 fields of a given frame followed by 2 fields of the next frame. For a 3:2 pull down field sequence (e.g., for a 60 fields/second video converted from 24 frames/second film), better output images may be obtained by processing the original frames (for example during frame rate conversion). The original fames may be recovered by detecting and removing duplicate fields inserted during telecine. The remaining field pairs are then merged to form progressive frames at the original 24 (or 23.967) fps.

Reverse telecine algorithms rely on the detecting repeated fields, in order to perform the reverse 3:2 pull down. The detection of duplicate fields may be complicated by graphics overlays that were not part of the original cinema source. Identical fields in the source data may be interpreted as different pictures by 3:2 pull down detector, as a result of different overlaid images.

A display equipped with a reverse telecine block may thus benefit from receiving video images containing a 3:2 pull down sequence separately from corresponding overlay images that do not. Advantageously, as video and overlay images from video source 200 is received separately prior to composition in display 300, inverse telecine block 320 may perform reverse telecine process on just the video images like image 402 (having a 3:2 pull down cadence)—which avoids difficulties that can potentially arise from superimposed overlay images (like image 404).

Figure 5:
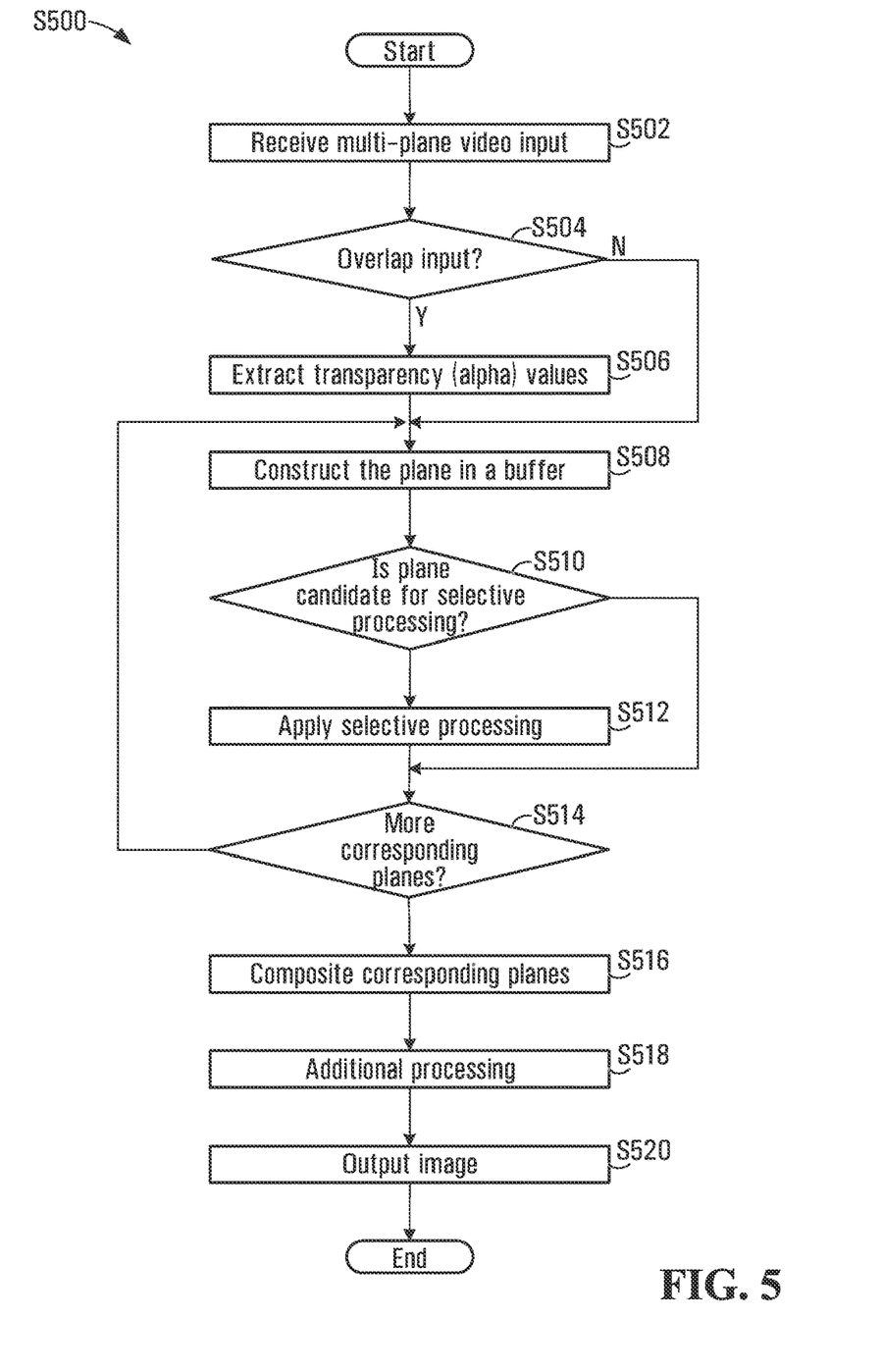
FIG. 5 is a flowchart illustrating various steps performed in the exemplary display depicted in FIG. 3.

The general process carried out in display 300 is summarized in a flowchart S500 depicted in FIG. 5. As depicted, display 300 initially receives decompressed multi-layered video input (S502). If the plane data is for an overlay plane (S504) then transparency (alpha) values are extracted (S506) for use in composition.

The image is then constructed in a buffer from the received data (S508). If the constructed image is a candidate for selective processing (S510), then selective processing is applied to the image (S512). For example, as noted above, de-noising may be applied selectively to a video image (but not the overlay image). Generally, if more corresponding images exist (S514), then they are also constructed, a subset of them may be selectively processed as needed.

After all the corresponding images are constructed (a subset of which may be selectively processed as needed), they are then composited (S516) to form an image for display. Additional processing may be applied to the image (S518), after which display 300 outputs the final image.

Embodiments exemplary of the present invention may be used in digital displays interconnected to set-top boxes, Blu-ray players, HD DVD players, terrestrial or satellite digital television receivers, and the like by way of a video link such as video link 216, that is capable of carrying multiple streams of uncompressed plane/image data. Embodiments of video link 216 may include wired as well as wireless links.

In other alternate embodiments, in addition to the various blocks shown for display 300, one or more additional blocks such as a de-blocking circuit block, de-ringing block, image softening/sharpening block or the like, may be present for additional video processing.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:
1. A method of multi-layered video processing video at a video source and a display device, said video source comprising a composition engine having a composition buffer, said method comprising:
at said video source:
forming decoded video images by decoding a first input video bitstream comprising compressed video;
forming decoded overlay images by decoding a second input graphics bitstream received as an auxiliary bitstream in addition to the first input video bitstream and comprising graphics overlay data, said decoded overlay images associated with said decoded video images; and
forming a plurality of additional decoded overlay images from a plurality of additional input bitstreams comprising additional graphics overlay data;
compositing, via said composition engine, said additional decoded overlay images with said decoded overlay images formed from said second input graphics bitstream to form composited overlay images;
configuring said composition engine, capable of compositing images, to not composite said decoded overlay images with said decoded video images;
concurrently transmitting to said display device capable of compositing images, a first stream comprising said decoded video images and a second stream comprising said composited overlay images;
at said display device:
receiving said first and second streams;
selectively performing image processing on said received decoded video images, without having composited said overlay images with said received video images, to form enhanced video images;
compositing, pixels from each of said composited overlay images with respective pixels from each of said enhanced video images to form output images for display at said display device.

2. A system for multi-layered video processing, the system comprising:
a video source device for providing video for display, the video source device comprising:
a stream source providing a first input video bitstream comprising compressed video and a second input graphics bitstream comprising graphics overlay data, said second input graphics bitstream provided as an auxiliary stream in addition to the first input video bitstream;
memory comprising at least a first buffer and a second buffer;
a decoder in communication with said stream source and memory, for decoding said first input video bitstream to form decoded video images in said first buffer, said decoder also forming decoded overlay images in said second buffer by decoding said second input graphics bitstream, said decoded overlay images associated with said decoded video images;
a composition engine capable of compositing images and configured to not composite said decoded video images and said decoded overlay images respectively in said first input video bitstream and said second input graphics bitstream; and
a display output interface coupled to first and second buffers, for sampling both said first and second buffers, to concurrently transmit a first stream comprising said decoded video images without overlay and a second stream comprising said decoded overlay images to said display device; and
said display device comprising:
an input interface for receiving said first and second stream;
memory in communication with said input interface; and
a processing block, a composition engine; and a display screen, all in communication with said memory;

said processing block selectively image processing said decoded video images, without having composited said decoded overlay images with said received decoded video images, to form enhanced video images and said composition engine compositing, pixels from each of said overlay images with respective pixels from each of said enhanced video images as image processed by said processing block, to form output images for display on said display screen.

3. The system of claim 2, wherein said first stream comprises stuffing symbols, if said first buffer is empty.

4. The system of claim 2, wherein said second stream comprises stuffing symbols, if said second buffer is empty.

5. The system of claim 2, wherein said stream source comprises an optical drive having a medium containing said first and second bitstreams loaded therein.

6. The system of claim 2, wherein said stream source comprises one of: a hard disk, a gaming device, a network access point in communication with a video server, a tuner interconnected to a terrestrial antenna, and a demodulator interconnected to a digital satellite.

7. The system of claim 2, wherein said decoded video images and said decoded overlay images are transmitted at the same rate.

8. The system of claim 2, wherein said display output interface includes a multiplexer to output a time division multiplexed serial output comprising said first and second streams.

9. The system of claim 2, wherein said processing block comprises at least one of a scaling block, a de-interlace block, an inverse telecine block, a color space conversion block, and a de-noising block.

10. The system of claim 2, wherein said processing block processes said output images prior to display.

11. The system of claim 2, wherein said input interface includes a de-multiplexer to receive multiplexed serial data and de-multiplex said multiplexed data into said first stream of decoded video images and said second stream of decoded overlay images.

* * * * *